(12) United States Patent
Rao et al.

(10) Patent No.: US 7,870,230 B2
(45) Date of Patent: Jan. 11, 2011

(54) POLICY-BASED CLUSTER QUORUM DETERMINATION

(75) Inventors: Sudhir G. Rao, Portland, OR (US); Bruce M. Jackson, Portland, OR (US); Soumitra Sarkar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1579 days.

(21) Appl. No.: 11/182,469

(22) Filed: Jul. 15, 2005

(65) Prior Publication Data
US 2007/0016822 A1  Jan. 18, 2007

(51) Int. Cl.
G06F 15/177 (2006.01)
G06F 15/173 (2006.01)
G06F 11/00 (2006.01)

(52) U.S. Cl. ............... 709/220; 709/224; 709/225; 714/4

(58) Field of Classification Search ............ 709/220, 709/224, 225; 714/4
See application file for complete search history.

(56) References Cited

U.S. PATENT DOCUMENTS

| | | | | |
|---|---|---|---|---|
| 6,487,622 | B1 | 11/2002 | Coskrey, IV et al. | 710/241 |
| 6,662,219 | B1* | 12/2003 | Nishanov et al. | 709/220 |
| 6,711,606 | B1 | 3/2004 | Leymann et al. | 709/203 |
| 7,240,234 | B2* | 7/2007 | Morita et al. | 714/4 |
| 7,464,378 | B1* | 12/2008 | Limaye et al. | 718/100 |
| 2002/0095470 | A1 | 7/2002 | Cochran et al. | 709/208 |
| 2002/0161889 | A1 | 10/2002 | Gamache et al. | 709/226 |
| 2003/0023680 | A1 | 1/2003 | Shirriff | 709/204 |
| 2003/0220967 | A1 | 11/2003 | Potter et al. | 709/203 |
| 2004/0153558 | A1 | 8/2004 | Gunduc et al. | 709/229 |
| 2005/0132154 | A1* | 6/2005 | Rao et al. | 711/162 |
| 2005/0228947 | A1* | 10/2005 | Morita et al. | 711/114 |

FOREIGN PATENT DOCUMENTS

WO  WO0054152  9/2000

OTHER PUBLICATIONS

N. R. Adam; "A New Dynamic Voting Algorithm for Distributed Database Systems," Jun. 1994, vol. 6, No. 3, pp. 470-478.
PCT, "Notification Of Transmittal Of The International Search Report And The Written Opinion Of The International Searching Authority," Nov. 22, 2006, PCT/EP2006/063254, PCT counterpart to U.S. Appl. No. 11/182,469, 12 pages.

* cited by examiner

Primary Examiner—George C Neurauter, Jr.
Assistant Examiner—Clarence John
(74) Attorney, Agent, or Firm—Walter W. Duft

(57) ABSTRACT

A system, method and computer program product for use in a server cluster having plural server nodes implementing a server tier in a client-server computing architecture in order to determine which of two or more partitioned server subgroups has a quorum. A determination is made of relative priorities of the subgroups and a quorum is awarded to the subgroup having a highest relative priority. The relative priorities are determined by policy rules that evaluate comparative server node application state information. The server node application state information may include one or more of client connectivity, application priority, resource connectivity, processing capability, memory availability, and input/output resource availability, etc. The policy rules evaluate the application state information for each subgroup and can assign different weights to different types of application state information. An interface may be provided for receiving policy rules specified by a cluster application.

20 Claims, 6 Drawing Sheets

POLICY-BASED CLUSTER QUORUM DETERMINATION

BACKGROUND OF THE INVENTION

1. Field of the Invention

The present invention relates to computer clusters and quorum determination methods for cluster partition recovery. More particularly, the invention concerns a quorum determination technique that takes into account server node application state information in addition to conventional cluster majority considerations, and which provides an interface whereby quorum determination rules can be programmed by cluster applications.

2. Description of the Prior Art

By way of background, managed data processing clusters are commonly used to implement the server tier in a client-server architecture. Instead of a single server providing application services to clients, application service functions are shared by an interconnected network of server nodes (server cluster) operating cooperatively under the control of cluster management software. Responsibilities of cluster management software commonly include the coordination of cluster group membership changes, fault monitoring and detection, and providing the server node application layers with distributed synchronization points so that the servers can implement a cluster application tier that provides a clustered service. Clustered services are advantageous because plural server nodes can share application workloads and thus improve data processing performance. Even if the server nodes run individual applications and do not share application workloads, the loss of a server node will not ordinarily bring down its applications because the cluster management software can transfer the lost server's functions to another server node. Exemplary applications that can be run by a server cluster include network file systems, distributed databases, web servers, email servers, and many others.

Notwithstanding the enumerated advantages of server clusters, such networks are prone to a phenomenon known as "partitioning" wherein there is a failure of a cluster server node or a communication link between server nodes that disrupts cluster operations. As its name implies, partitioning means that the cluster server nodes have lost the ability to interoperate as a single group and instead divide into two or more separately functioning subgroups. This creates problems because each subgroup acts without regard to the other and data corruption can result if the subgroups attempt to run the same applications or control the same devices (such as data storage systems). In order to properly recover from a partition event, it is usually necessary to allow only one of the functioning subgroups to continue server operations, while all other subgroups are deactivated from service until the problem that caused the partitioning is resolved.

The conventional technique used to recover functionality in a partitioned cluster is to perform a quorum management operation that attempts to identify the largest remaining subgroup. In a typical quorum management scheme, each cluster server node is assigned a number of votes. Following partitioning, all of the operational server nodes within each subgroup respectively pool their votes. The subgroup that has the most votes is permitted to form a new cluster and assume all server duties. In the event of a tie, a quorum resource, such as a shared data storage device whose access is not impacted by the fault that induced the partition, and which can be seen by all subgroups, can be used as a "tie breaker." The first operational subgroup to acquire a lock on the quorum resource is given an extra vote, and thereby determined to have a quorum.

A disadvantage of current quorum management techniques is that they do not take into account the operational state of each subgroup relative to its application tier, such as the number of connected clients, the applications being served, the ability to satisfy external resource dependencies, subgroup processing capability, memory availability, I/O (Input/Output) resource availability, etc. The failure to consider such information can have adverse consequences. For example, there will be unacceptable disruption of end-to-end application service availability if cluster recovery results in a majority (or even all) of the application clients ending up on the wrong side of the partition (i.e., connected to a subgroup that does not have a quorum and unable to communicate with the subgroup that does have the quorum). Serious consequences can also result if the partitioned subgroups service applications with differing availability requirements (e.g., low importance applications versus a high priority business critical application), and a quorum is denied to the subgroup running the high priority application simply because the high priority application runs on a server node in a minority subgroup. The manageability of a recovered cluster will likewise be compromised if the original cluster relied on an external service such as a directory or administration server (e.g., for managing user and authentication information) and a quorum is won by a subgroup that does not have access this external resource. Ignoring information such as the aggregate subgroup processing capability, memory availability, I/O (Input/Output) resource availability, etc., can also result in less than optimal partition recovery.

It is to improvements in cluster quorum determination techniques that the present invention is directed. In particular, what is needed is a quorum determining methodology that takes into account factors beyond the traditional majority approach when recovering a partitioned cluster. In particular, it would be desirable to move away from a cluster-centric approach wherein quorum determination solutions are dictated solely by cluster management concerns to solutions that take into account the needs of cluster applications and their clients.

SUMMARY OF THE INVENTION

The foregoing problems are solved and an advance in the art is obtained by a novel quorum determination system, method and computer program product for use in a server cluster having plural server nodes implementing a server tier in a client-server computing architecture in order to determine which of two or more partitioned server subgroups has a quorum. Quorum determination according to the invention involves a determination of the relative priorities of each subgroup and the award of a quorum to the subgroup having the highest relative priority. The relative priorities are determined by policy rules that evaluate server node application state information. The policy rules can assign different weights to different types of application state information according to existing circumstances, and otherwise implement complex priority determining logic. An interface is provided for receiving policy rules specified by a cluster application.

In order to facilitate the determination of relative subgroup priorities, the server nodes share a state information resource. Each server node includes state saving logic so that the node can record its own application state information to the shared state information resource following a cluster partition. The relative subgroup priorities can be determined by subgroup priority determining logic associated with each subgroup. The subgroup priority determining logic within a given subgroup inspects the application state information for that subgroup using the shared state information resource, and determines the subgroup's relative priority. An attempt is then made to acquire a quorum resource lock according to the subgroup relative priority. A quorum resource lock will be awarded to the subgroup having the highest subgroup relative priority.

In conjunction with invoking the subgroup priority determining logic within the various subgroups, each subgroup may elect a server node that will implement this logic on behalf of the subgroup. The same subgroup leader can also request the quorum resource lock on behalf of the subgroup. Alternatively, multiple (or even all) server nodes in each subgroup could implement the priority determining logic and request the quorum resource lock.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1:
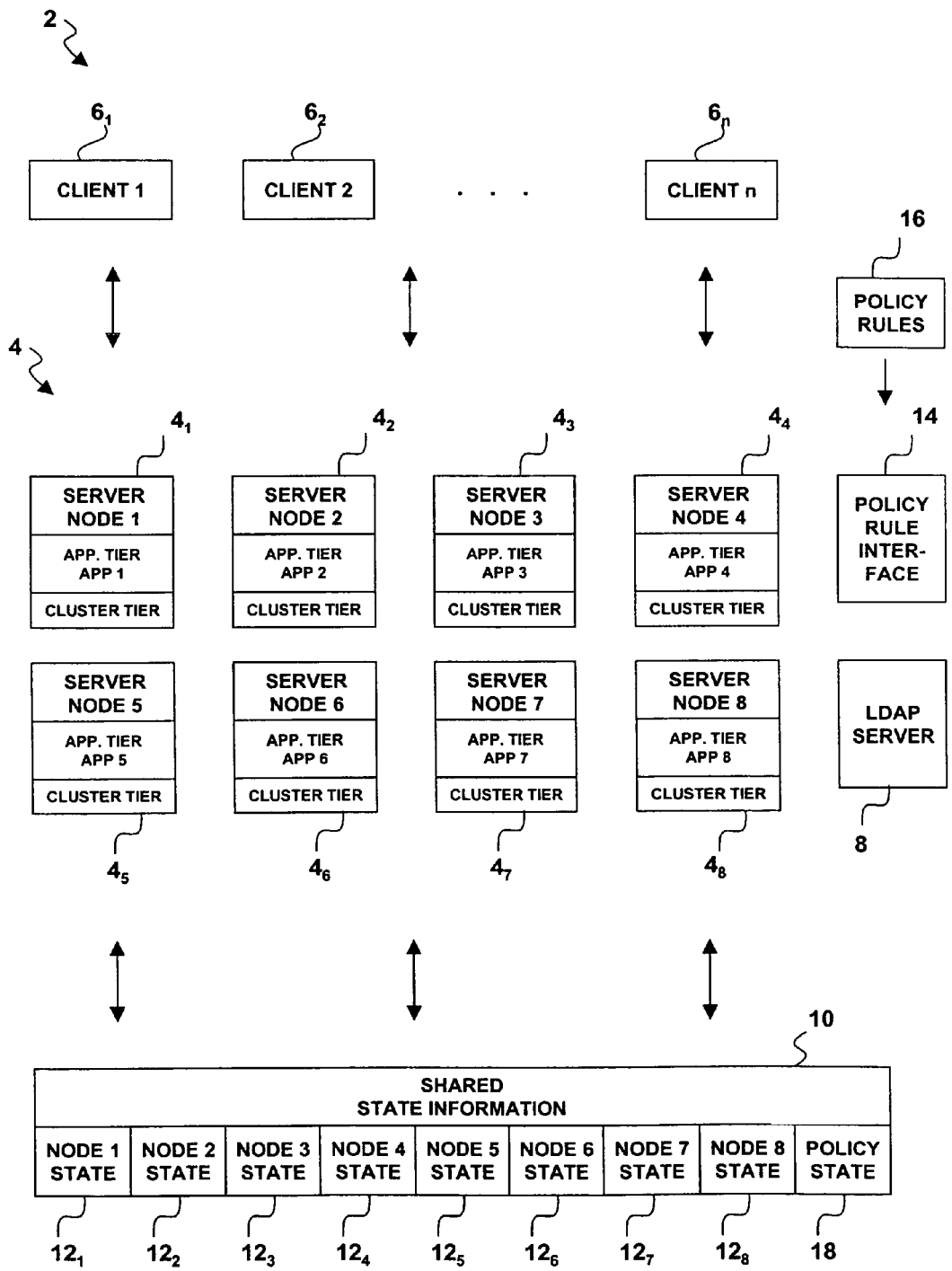
FIG. 1 is a functional block diagram showing a client-server computing architecture in which the server tier is implemented by way of a server cluster that is adapted to perform quorum determination in accordance with the present invention.

Turning now to the drawing figures wherein like reference numbers indicate like elements in all of the several views, FIG. 1 illustrates a client-server computing architecture 2 wherein the server tier is provided by a server cluster 4. For purposes of illustration only, and not by way of limitation, the server cluster 4 is implemented as a network (network interconnections not shown) that comprises eight server nodes designated by reference numerals $4_1, 4_2, 4_3, 4_4, 4_5, 4_6, 4_7$ and $4_8$. The server nodes $4_1$-$4_8$ are computer platforms that run cluster management software in a cluster management tier as well as application programs that rely on the cluster management software to implement a cluster application tier on behalf of an arbitrary number of client nodes designated by reference numerals $6_1, 6_2 \ldots 6_n$. The client nodes $6_1, 6_2 \ldots 6_n$ may communicate with the server nodes $4_1$-$4_8$ by way of any suitable communication interface. For example, there could be a single client-server network (not shown) in which all client nodes are able to communicate with all server nodes. Alternatively, there could be several client-server networks (not shown) wherein subsets of client nodes communicate with subsets of server nodes. A further alternative would be to provide a plurality of individual communication links (not shown) wherein each client node communicates with a single server node.

The application tier software run by the server nodes $4_1$-$4_8$ could include single-node applications that each run individually on a single server node, or distributed applications that run collectively on plural server nodes. Alternatively, there could be a mix of both types of applications running in the application tier on the server nodes $4_1$-$4_8$. For purposes of illustration only, and not by way of limitation, FIG. 1 illustrates a scenario wherein each server node $4_1$-$4_8$ runs one single-node application. These applications are respectively designated as App 1, App 2, App 3, App 4, App 5, App 6, App 7, and App 8, with the application number corresponding to the server node number on which it runs.

In all cases, the application tier software will interact with the cluster management tier software that runs on the server nodes $4_1$-$4_8$ so that the server node applications can behave as a clustered service. To that end, the cluster management tier software conventionally provides the application tier software with distributed synchronization points and other services. Additional responsibilities of the cluster management tier software traditionally include the coordination of cluster group membership changes, together with fault monitoring and detection. Moreover, as described in more detail below in connection with FIG. 4, the cluster management tier software also implements partition recovery operations in accordance with the invention.

An LDAP (Light Directory Access Protocol) server 8 provides an external resource that may be used by the server nodes $4_1$-$4_8$ for various purposes, such as managing client and authentication information, or to perform other administration functions. A shared state information resource 10 is also present that allows the server nodes $4_1$-$4_8$ to share operational state information relative to their application tier functions (hereinafter "server node application state information"), as described in more detail below. Insofar as there are eight server nodes $4_1$-$4_8$ shown in FIG. 1, there are eight corresponding instances of shared state information respectively designated $12_1, 12_2, 12_3, 12_4, 12_5, 12_6, 12_7$ and $12_8$. All of these instances are subparts of the collective state information maintained by the shared resource 10, and it is assumed that all of the server nodes $4_1$-$4_8$ can see all of the shared state information instances $12_1, 12_2, 12_3, 12_4, 12_5, 12_6, 12_7$ and $12_8$ following partition.

The shared resource 10 can be implemented as a storage device that is accessible by each server node $4_1$-$4_8$, preferably by way of a fault tolerant network that is separate from the server network that interconnects the server nodes to form the cluster 4, and which is also separate from any client-server network that interconnects the server nodes to the client nodes $6_1, 6_2 \ldots 6_n$. One example of a storage device that may be used to implement the shared resource 10 is a disk drive system wherein each server node $4_1$-$4_8$ is assigned its own disk area (e.g., blocks, sectors, etc.) for storing the state information $12_1$-$12_8$. As an alternative to using a storage device to implement the shared resource 10, the resource could be implemented as a multicast or other communication protocol wherein each server node $4_1$-$4_8$ multicasts its state information $12_1$-$12_8$ to all other reachable nodes over a fault tolerant network. Each server node $4_1$-$4_8$ receiving state information from another node will update its section of the shared state. Other shared resource implementations may also be possible.

A further feature of the client-server computing architecture of FIG. 1 is a policy rule interface 14 implemented in the cluster management tier of the server cluster 4 in order to receive policy rules 16 specified by the server cluster application tier (e.g., any of App 1-App 8). The policy rule interface 14 can be implemented as an API (Application Program Interface) provided by the cluster management tier software at one (or all) of the server nodes $4_1$-$4_8$. The policy rules 16 are specified by an application calling the policy rule API. Corresponding policy state information can then be stored by the API, preferably in the shared resource 10, as shown by reference numeral 18. Alternatively, a copy of the policy state information could be maintained locally at each server node $4_1$-$4_8$.

Figure 2:
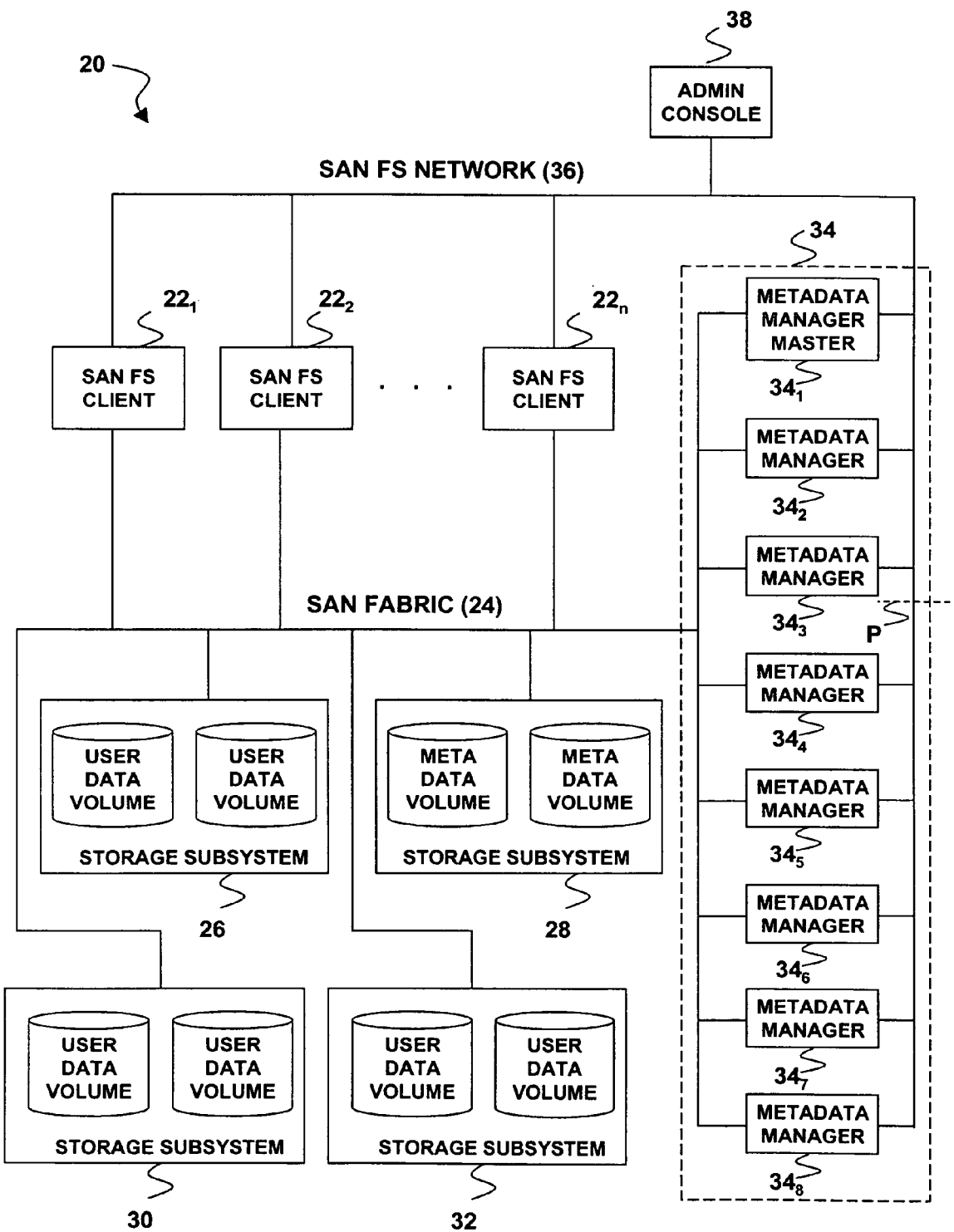
FIG. 2 is a functional block diagram showing an exemplary implementation of the client-server computing architecture of FIG. 1 in a storage area network implementing a distributed file system.

Turning now to FIG. 2, an exemplary environment in which the client-server computing architecture 2 of FIG. 1 may be implemented is shown. In particular, FIG. 2 illustrates a Storage Area Network (SAN) 20 in which plural SAN file system clients $22_1$, $22_2$ ... $22_n$ are interconnected by way of a SAN fabric 24 to a system storage pool comprising (by way of example only) four storage subsystems 26, 28, 30 and 32. A server cluster 34 (corresponding to the server cluster 4 of FIG. 1) is used to support distributed file system operations in the SAN 20. As is known in the data storage art, the goal of a distributed file system in a SAN environment is to provide such benefits as a global namespace for files regardless of where they are stored, shared access from any storage manager to any network storage device, and centralized, policy-based management. One commercial product that provides a SAN-based distributed file system is the IBM® TotalStorage® SAN File System. This product implements out-of-band storage virtualization wherein file metadata (e.g., file names, attributes, permissions, etc.) are stored in a different location than the file blocks that represent user data. In FIG. 2, the server cluster 34 comprises eight meta-data managers $34_1$, $34_2$, $34_3$, $34_4$, $34_5$, $34_6$, $34_7$ and $34_8$ (corresponding to the server nodes $4_1$-$4_8$ of FIG. 1) that handle file metadata on behalf of the file system clients $22_1$, $22_2$ ... $22_n$. This metadata is shown in FIG. 2 to be stored in two metadata volumes situated on the storage subsystem 28. The metadata managers $34_1$-$34_8$ communicate with the file system clients $22_1$, $22_2$ ... $22_n$ via network 36, using TCP/IP packet communication or the like.

During data retrieval operations in the SAN 20, the metadata managers $34_1$-$34_8$ processes metadata requests from the file system clients $22_1$, $22_2$ ... $22_n$ that invoke metadata manager server functions. Thus, when one of the file system clients $22_1$, $22_2$ ... $22_n$ needs to transfer file data to or from one of the storage subsystems 26, 30 or 32 that holds user data, it queries one of the metadata managers $34_1$-$34_8$ to determine the file's location and other control information. Once this information is returned to the requesting file system client $22_1$, $22_2$ ... $22_n$, and it obtains appropriate locks on the file, the file system client can perform the required data transfer operation without further intervention by the metadata managers $34_1$-$34_8$.

In a distributed file system product such as the IBM® TotalStorage® SAN File System, each metadata manager $34_1$-$34_8$ typically performs metadata operations relative to some assigned portion of the distributed file system namespace. Each metadata manager $34_1$-$34_8$ may thus be thought of as running a separate metadata server application (also known as a partition), and these applications can be analogized to the applications labeled App 1 ... App 8 in FIG. 1. Any file system client $22_1$, $22_2$ ... $22_n$ that needs to access a file will be directed to the metadata manager $34_1$-$34_8$ that is responsible for the portion of the file system namespace subtree that corresponds to the specified file name.

In theory, each metadata manager $34_1$-$34_8$ will interact with the file system clients $22_1$-$22_8$ on an equal basis relative to the files they request. In practice, however, it is very common for some of the metadata managers $34_1$-$34_8$ that are responsible for frequently accessed files to receive more metadata requests than other metadata managers. The metadata managers that service requests for the frequently accessed files may be thought of as running applications that are more important than the applications run by other metadata managers. One of the metadata managers $34_1$-$34_8$ may also have namespace responsibility for files that are considerably more important than the files handled by other metadata managers (e.g., files associate with a mission critical business application). In that case, such a metadata manager may be thought of as running a high priority application relative to the other metadata managers that run low priority applications.

Another feature of the IBM® TotalStorage® SAN File System is that one of the metadata managers $34_1$-$34_8$ will be assigned to function as a master metadata manager. In FIG. 2, this is the metadata manager $34_1$. Any of the other metadata managers $34_2$-$34_8$ could likewise function as the master (the designation of manager $34_1$ being arbitrary), or they could be selected to replace the metadata manager $34_1$ if it failed). The master metadata manager $34_1$ is responsible for cluster management, including the assignment of distributed file system namespace responsibilities to other metadata managers $34_2$-$34_8$, and the failover of metadata server functions from a failed metadata manager to one or more of its peers. The master metadata manager $34_1$ also provides a metadata management administrative interface that can be accessed by way of the administrative console 38 in FIG. 2. This interface may be used to augment the policy rule interface 14 of FIG. 1 to facilitate the direct human input of policy rules.

Although not shown in FIG. 2, the metadata managers $34_1$-$34_8$ may interact with an external resource, such as the LDAP server 8 shown in FIG. 1. FIG. 2 also lacks specific illustration of the shared resource 10 of FIG. 1. However, in the SAN environment of FIG. 2, the storage subsystem 28 that holds the metadata volumes would be a candidate storage device that could maintain such information, as could other resources in the SAN network storage pool (provided the metadata managers $34_1$-$34_8$ have access thereto).

If one of the metadata managers $34_2$-$34_8$ fails or is disconnected during operations of the server cluster 34, its functions can normally be failed over to one or more of its peers by the master metadata manager $34_1$. However, if a fault occurs in the network 36 that results in the formation of distinct disjoint subgroups within the metadata managers $34_2$-$34_8$, a cluster partition scenario will arise in which a quorum determination technique must be used to reform the cluster around one of the subgroups. If a conventional partition management strategy is implemented, the cluster reformation would utilize a quorum disk and a majority voting procedure to award the quorum to the largest active, mutually-connected subgroup of metadata managers that all have access to the system storage pool. As described by way of background above, this conventional technique does not take into account application state information such as the number of "clients" ($22_1$-$22_n$) connected to the metadata managers $34_1$-$34_8$, the relative priority of the "applications" run on their behalf, or the ability of the chosen subgroup to communicate with an external resource, such as the LDAP server 8 of FIG. 1.

Figure 3:
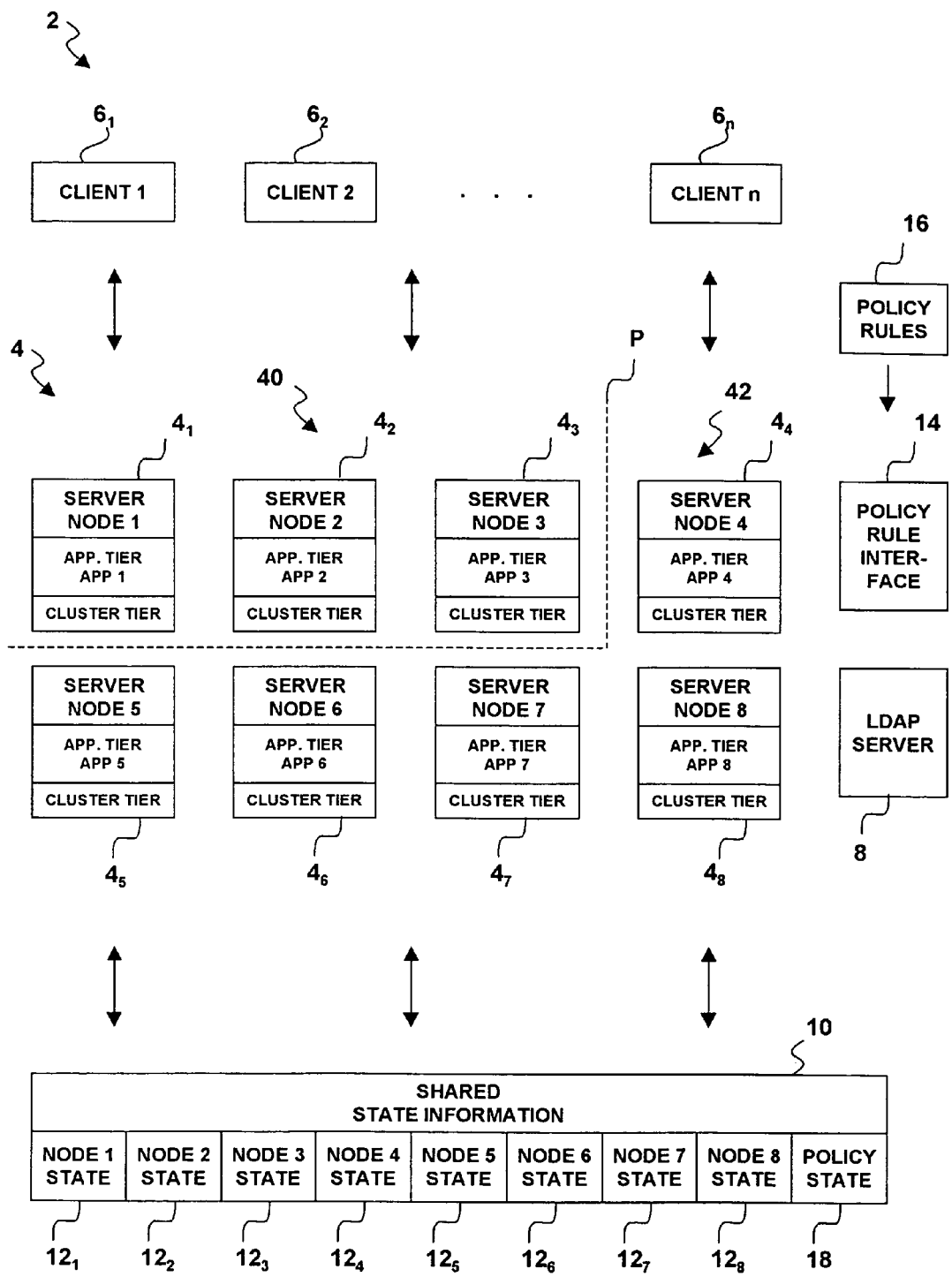
FIG. 3 is a functional block diagram showing an exemplary partitioning of the client-server computing architecture of FIG. 1.

Turning now to FIG. 3, an example of partitioning as can occur in the server cluster 34 of FIG. 2 is shown in the context of the generalized client-server architecture 2 of FIG. 1. In particular, FIG. 3 illustrates a server cluster partition "P" in which a fault occurs that forms two subgroups 40 and 42. Subgroup 40 contains server nodes $4_1$-$4_3$, while subgroup 42 contains server nodes $4_4$-$4_8$. According to the conventional "majority rules" quorum determination technique, a quorum would be awarded to subgroup 42 because it comprises five server nodes versus the three server nodes of subgroup 40. However, it could be that subgroup 40 is connected to more of the clients $6_1$, $6_2$ ... $6_n$, or that one of the applications App 1, App 2 or App 3 is a high priority application, or that subgroup 40 has connectivity to the LDAP server 8, whereas subgroup 42 does not. If the server cluster 4 of FIG. 3 is embodied in the server cluster 34 of FIG. 2, it will be seen that the network fault which causes the partition "P" will occur between the metadata managers $34_3$ and $34_4$. In that case, as shown in FIG. 2, the metadata managers $34_4$-$34_8$ could be entirely cut off from the file system clients $22_1$-$22_n$ and the conventional technique quorum determination approach would clearly be problematic. The quorum would be awarded to the metadata managers $34_4$-$34_8$ because they outnumber the metadata managers $34_1$-$34_3$, yet the reformed cluster would be unable to perform the required application functions due to the network fault.

The present invention takes such matters into account by determining the relative priorities of each subgroup and awarding a quorum to the subgroup having a highest relative priority. The relative priorities are determined by the policy rules 16 that can be stored as policy state information 18 in the shared resource 10. The policy rules 16 are used to evaluate the shared application state information $12_1$-$12_8$ recorded by the server nodes $4_1$-$4_8$ in the shared resource 10. Advantageously, the policy rules 16 can assign different weights to different types of application state information according to existing circumstances, and otherwise implement complex priority determining logic.

Figure 4:
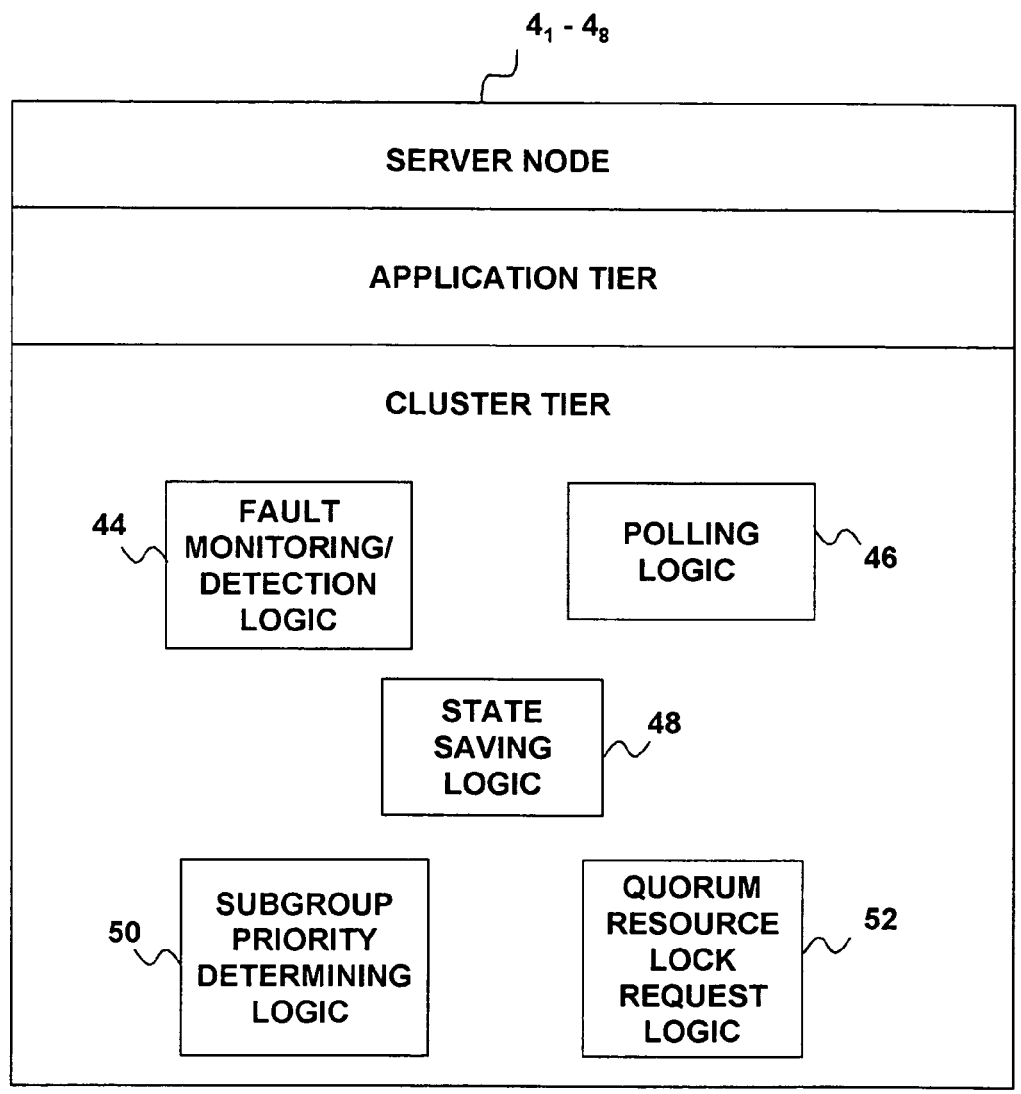
FIG. 4 is a detailed functional block diagram showing exemplary features of the server nodes of the client-server computing architecture of FIGS. 1 and 3.

The sequence of actions taken by the server nodes $4_1$-$4_8$ following a partition event, and the cluster management tier logic entities responsible for taking such actions, will now be described with reference to FIGS. 4 and 5. As shown in FIG. 4, each server node $4_1$-$4_8$ includes conventional fault monitoring and detection logic 44 that can determine when a cluster partition occurs. Each (functional) server node $4_1$-$4_8$ will thus be aware of a partition event and each will independently begin post-partition processing. In one alternative, a single server node in each subgroup acts as a subgroup leader on behalf of other server nodes in the same subgroup. According to this approach, only the subgroup leader performs priority determination processing in competition with the leader(s) of the other sub-group(s). The remaining server nodes are only involved to the point of selecting the subgroup leader and persisting their own application state information to the shared resource 10. They do not participate further in the priority determination process. In another alternative, each server node independently performs priority determination processing as a "free agent," in competition with all other nodes. The subgroup associated with the winner of this competition would be granted the quorum.

Figure 5:
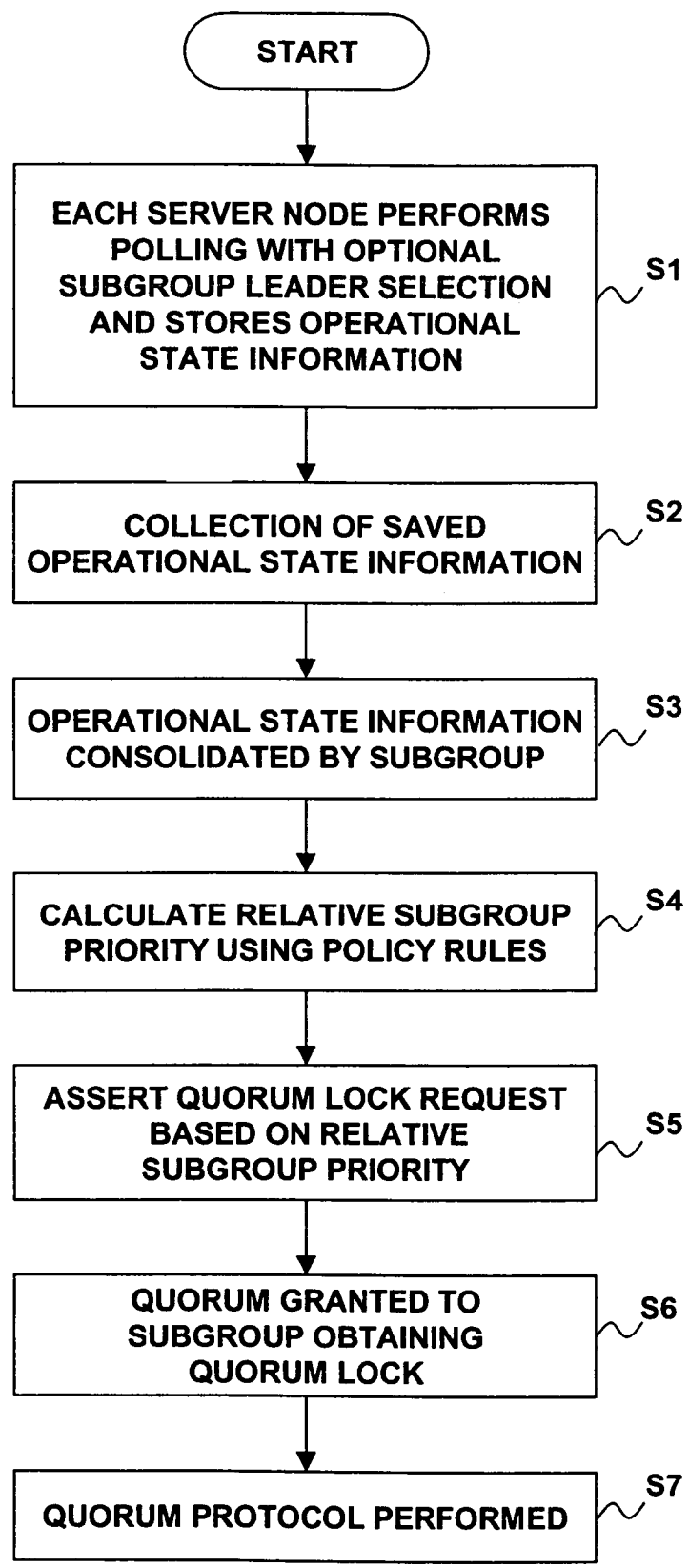
FIG. 5 is a flow diagram illustrating exemplary quorum determination steps in accordance with the invention.

Regardless whether the "subgroup leader" or "free agent" approach is implemented, each server node $4_1$-$4_8$ will comprise polling logic 46 in its cluster management tier that performs a first exemplary step S1 of FIG. 5 in which each server node $4_1$-$4_8$ attempts to poll all other server nodes following a partition to identify their subgroup peers based on the responses received. For example, in the subgroup 40 of FIG. 3, server node $4_1$ would receive polling responses from nodes $4_2$ and $4_3$, but not from nodes $4_4$-$4_8$. Server node $4_1$ would thus deduce that it is in a subgroup comprising three members, namely, itself and server nodes $4_2$ and $4_3$. If the "subgroup leader" approach is being used, the polling operation of step S1 of FIG. 5 can be implemented in a manner that also allows a subgroup leader to be selected. By way of example, each server node $4_1$-$4_8$ can send a message (ballot) to all other nodes proposing itself (based on node identification number) as the leader. Each server node receiving this ballot compares its node identification number to the ballot and responds to the ballot sender. If the ballot recipient's own local node identification number is lower than the number in the ballot, it vetoes the ballot by sending a NO vote to the ballot sender. Otherwise, it sends a YES vote. The member of the subgroup receiving zero NO votes is the leader. If the "free agent" approach is being used, there would only be polling between the server nodes to identify subgroup peers, and no balloting would be performed.

Step S1 of FIG. 5 further includes each server node $4_1$-$4_8$ recording its application state information to the shared state resource 10. As shown in FIG. 4, this processing is performed by state saving logic 48 within the cluster management tier of each server node $4_1$-$4_8$. As an alternative to persisting application state information in a post-partition setting, each server node $4_1$-$4_8$ could update its application state information synchronously, as the state changes. In that case, the shared resource 10 would maintain the state information continuously, in real time, so that it is available immediately following partitioning. The application state information that is provided by the state saving logic 48 to the shared resource 10 is a matter of design choice that will typically be influenced by the policy rules in effect. As such, the state saving logic 48 could access the policy state information 18 (either directly or via the policy rule interface 14) to determine what information needs to be recorded. Alternatively, a list of the application state information requiring recordation could be maintained locally by the state saving logic 48 at each server node $4_1$-$4_8$.

It is contemplated that different kinds of application state information will be important to different enterprises when determining relative subgroup priorities following a cluster partition. Without limiting the generality of this observation, information parameters that may be of particular interest include, but are not necessarily limited to: (1) a count of the number of client nodes that remain connected to a server node following partitioning, (2) the priority of each application run by a server node following partitioning and/or a count of the number of client nodes using high priority applications, (3) the ability of a server node to access external resources (such as the LDAP server 8) following partitioning, and (4) the size of each subgroup. Additional application state parameters could also be considered, including but not necessarily limited to, information about subgroup aggregate processing capability, memory availability, I/O (Input/Output) resource availability, etc.

The first exemplary information parameter listed above can be an integer number determined as a result of a client polling operation. The polling operation can be performed using conventional lease-based or heartbeat-based polling techniques, or other similar techniques, as are employed in client-server architecture products developed for the enterprise market. Thus, after a brief time out following a server node's determination that a partition event has occurred (or in real time as described above), the state saving logic 48 can validate the continued connectivity of client nodes to that server node.

The second exemplary information parameter listed above has two parts that may be used in combination or in the alternative. The first part of the second information parameter is a priority value associated with each application being run by a server node following partitioning, and can be an integer number based on a pre-assigned application priority scheme. For example, applications could be given a ranking from 1 to 5, with 1 being the lowest priority and 5 being the highest priority. How the applications are assigned such rankings is a matter of design choice that will depend on the requirements of individual enterprises that implement the client-server computing architecture 2 (and can be specified as part of the policy rules 16). How each application is identified by the state saving logic 46 is also a matter of design choice (that can be implemented via the policy rules 16). For example, in the environment of FIG. 2, applications could be determined, for example, by the file system namespace sub-tree being handled by a given metadata manager $34_1$-$34_8$. In a clustered database server environment, applications could be identified by the table partitions being handled by a given database server. Each sub-tree, table partition, etc., representing an "application" can have a relative priority. The second part of the second information parameter is an integer value representing the number of connected client nodes $6_1$, $6_2$ ... $6_n$ running high priority applications. Because many client-server architectures designed for enterprise environments maintain a client session control block in the server tier that identifies which applications are being used by each client, this information should be readily available to the state saving logic 48. If the server-side state in the client control blocks is maintained and updated in the shared resource 10 through interactions between clients and server nodes, the required information will be available without having to perform client polling to gather the state.

The third exemplary information parameter listed above can be Boolean value that reflects whether or not a server node $4_1$-$4_8$ maintains connectivity to an external resource following partitioning. Alternatively, if there are more than one external resource, this parameter could be implemented as a count of the number of resources that remain connected to a server node $4_1$-$4_8$.

The fourth exemplary information parameter listed above can be an integer value or bit vector determined as a result of the polling logic 46 at each server node $4_1$-$4_8$ polling other server nodes and counting the number of respondents in step S1 of FIG. 5. Note that an integer value would only provide a count of the subgroup membership whereas a bit vector would affirmatively identify the subgroup members. In practice, only the server nodes that perform priority determination processing will need to store a bit vector. As described below, such information is needed in order to identity the other subgroup members and retrieve their application state information. Server nodes that do not perform priority determination processing do not need membership identification information and can store a simple integer count of the number of subgroup members.

Once the application state information has been saved for all server nodes that remain functional following a cluster partition, the relative subgroup priorities can be determined. This function can be performed by subgroup priority determining logic associated with each subgroup member that performs priority determination processing. As indicated above, this could be a subgroup leader or it could be all subgroup members acting a free agents. In FIG. 4, each server node $4_1$-$4_8$ is assumed to be provided with such logic (as shown by reference numeral 50) insofar as it is not known in advance which server nodes will survive a cluster partition and because any server node may be called upon to evaluate relative subgroup priorities following cluster partitioning (e.g., as a subgroup leader or as a free agent). As shown by step S2 in FIG. 5, each active instance of the subgroup priority determining logic 50 begins the subgroup priority determining process by collecting the application state information for all server nodes in its subgroup that have provided such state information to the shared resource 10 (or which have otherwise made their information available). As described above, a stored bit vector can be used to identify the subgroup server nodes.

As shown by step S3 in FIG. 5, once the subgroup application state information has been collected, each active instance of the priority determining logic 50 combines the saved state information for all server nodes of its own subgroup to generate a collective information snap shot for that subgroup. If the four exemplary information parameters enumerated above are used, the priority determining logic 50 will now have the following state information for its own subgroup: (1) a count of the number of client nodes that remain connected to the subgroup, (2) the priority of each application run by the subgroup and/or a count of the number of subgroup client nodes using high priority applications, (3) the ability of the subgroup to access an external resource (such as the LDAP server 8) following partitioning, and (4) the size of the subgroup. Again, other application state information may also be collected, such as information about subgroup processing capability, memory availability, I/O (Input/Output) resource availability, etc.

As shown by step S4 in FIG. 5, each active instance of the priority determining logic 50 can now apply the policy rules 16 contained in the policy state information 18 to the collective subgroup application state information for its own subgroup to determine the relative subgroup priority. The policy rules 16 provide a framework for evaluating the saved state information and can be customized according to enterprise requirements. In general, the policy rules 16 will apply prioritization criteria that may range from a very simple summation of information parameter values to extremely complex priority determining logic. In many cases, the policy rules 16 will involve weighting of the various information parameters according to their perceived importance. For example, it may be that the ability of a subgroup to communicate with an external resource, such as the LDAP server 8, is essential to continued cluster operation and thus trumps all other parameters. In that case, even a subgroup connected to the fewest client nodes, and running the lowest priority applications, and having the least number of server nodes, may be given the highest priority score. In similar fashion, an enterprise may place great value on the ability to run a high priority application that is critical to the enterprise. In that case, the policy rules 16 can weight this information parameter so that a subgroup that runs the high priority application is given the highest priority score even though another subgroup has more connected client nodes and/or has more server nodes. In a variant of this scenario, the policy rules 16 might specify that the subgroup running the high priority application is given the highest priority score unless it has less than "x" connected client nodes or "y" server nodes, in which case it is given a lower priority score.

The foregoing are just a few examples of the many types of policy rules that may be written to deal with the vast number of application state scenarios that may exist among subgroups following a cluster partition. It will be appreciated that these examples are not intended to be in any way exhaustive, and are set forth for purposes of illustration only.

As shown in FIG. 4, quorum resource lock request logic 52 is further associated with each server node $4_1$-$4_8$. Such logic will be active within a given server node $4_1$-$4_8$ if that node is a subgroup leader or is otherwise performing priority determination processing pursuant to steps S1-S4 above. The lock request logic 52 provides a tool that each server node $4_1$-$4_8$ actively performing priority determination processing uses to vie for a quorum based on the calculated relative priority of its subgroup. The lock request logic 52 is adapted to assert a quorum resource lock request according to the relative priority score calculated in step S4. This lock assertion step is shown at step S5 in FIG. 5. There are several ways that subgroup priority can be used during lock assertion. For example, each active instance of the lock request logic 52 could use its relative subgroup priority score as a delay mechanism when asserting a quorum resource lock request using a conventional lock/resource technique, such as SCSI 2 Reserve, SCSI 3 Persistent Reserve, etc. In this way, a subgroup with a lower relative priority will back off from vying for cluster leadership in favor of a subgroup with a higher relative priority. An alternative technique would be to use a resource/lock algorithm with an integrated priority mechanism. One such mechanism is disclosed in commonly assigned U.S. patent application Ser. No. 10/851,812, filed on May 21, 2004. No matter which resource/lock technique is used, a quorum resource lock will be awarded to the subgroup having the highest relative subgroup priority, and that subgroup will be granted the quorum. This is shown at step S6 in FIG. 5. In the unlikely event that two subgroups have the same priority score, it is assumed that the quorum lock mechanism itself will ensure that only one vying subgroup will win (using standard techniques).

Conventional cluster reformation can be performed by the subgroup that wins the quorum. For example, as shown in step S7 in FIG. 5, the subgroup (or subgroup leader) that has the quorum can initiate a cluster protocol with its quorum state value set to HAS_QUORUM. All other subgroups, via their leader or each individual server node, may run the same protocol to set their quorum state to NO_QUORUM. The subgroup having the quorum can then dissolve the subgroups that do no have the quorum by shutting down their cluster services. Other conventional techniques may also be used to reform the cluster around the quorum-owning subgroup.

Figure 6:
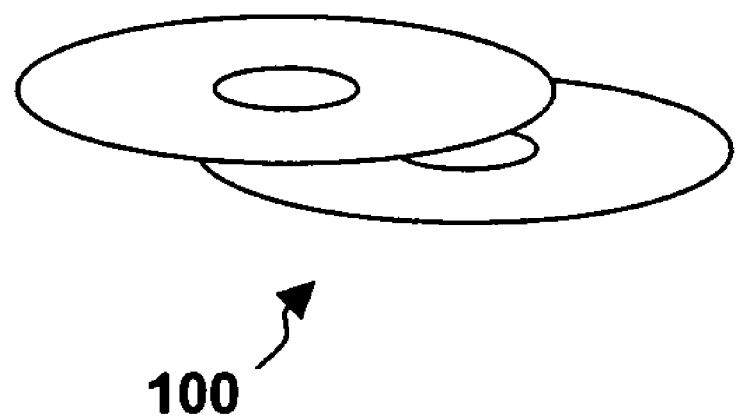
FIG. 6 is a diagrammatic illustration of storage media that can be used to store a computer program product for implementing intrusion detection functions in accordance with the invention.

Accordingly, a cluster partition recovery technique using application state-based priority determination to award a quorum has been disclosed. It will be appreciated that the inventive concepts may be variously embodied in any of a data processing system, a machine implemented method, and a computer program product in which programming means are recorded on one or more data storage media for use in controlling a data processing system to perform the required functions. Exemplary data storage media for storing such programming means are shown by reference numeral 100 in FIG. 6. The media 100 are shown as being portable optical storage disks of the type that are conventionally used for commercial software sales. Such media can store the programming means of the invention, either alone or in conjunction with an operating system or other software product that incorporates the required functionality. The programming means could also be stored on portable magnetic media (such as floppy disks, flash memory sticks, etc.) or on magnetic media combined with drive systems (e.g. disk drives) incorporated in computer platforms.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a server cluster having plural server nodes implementing a server tier in a client-server computing architecture, a quorum determination system for determining which of two or more partitioned server subgroups running different cluster applications on behalf of cluster application clients has a quorum, comprising:

priority determining logic implemented by one or more of said server nodes for determining relative priorities of said subgroups;

said relative priorities being determined by policy rules that evaluate server node application state information following a cluster partitioning that produces said subgroups, said application state information including application criticality information and application client connectivity information collected during operation of said cluster prior to said cluster partitioning;

said application criticality information and said application client connectivity information allowing said relative priorities to be determined according to relative priorities of cluster applications run by said subgroups and relative numbers of cluster application clients connected to said subgroups such that a relative importance of each subgroup may be determined based on the cluster applications each subgroup runs and the cluster application clients each subgroup serves; and quorum request logic implemented by one or more of said server nodes for requesting a quorum based on said relative priorities so that a quorum will only be awarded to a subgroup having a highest relative subgroup priority.

2. A system in accordance with claim 1 wherein said application state information further includes information concerning one or more of resource connectivity or availability, processing capability and memory availability.

3. A system in accordance with claim 2 wherein said policy rules evaluate, for each of said subgroups, the number of cluster application clients connected to said subgroup, the priority of cluster applications run by said subgroup, and the ability to access resources from said subgroup.

4. A system in accordance with claim 3 wherein said policy rules assign different weights to different types of application state information for determining said relative priorities of said subgroups.

5. A system in accordance with claim 1 further including policy rule interface logic implemented by one or more of said server nodes for receiving said policy rules from one said cluster applications.

6. A system in accordance with claim 1 further including:
a state information resource shared by said server nodes;
state saving logic implemented by each of said server nodes for providing application state information to said shared state information resource;
said priority determining logic comprising subgroup priority determining logic implemented by at least one of said server nodes in each subgroup for inspecting said application state information for said server node's associated subgroup using said shared state information resource; and
a quorum resource lock requester implementing said quorum request logic in each subgroup adapted to assert a quorum resource lock request according to an associated subgroup relative priority.

7. A system in accordance with claim 6 further including subgroup leader determining logic implemented by each of said server nodes for determining a subgroup leader that will implement said priority determining logic and said quorum resource lock requester on behalf of said subgroup.

8. In a server cluster having plural server nodes implementing a server tier in a client-server computing architecture, a quorum determination method for determining which of two or more partitioned server subgroups running different cluster applications on behalf of cluster application clients has a quorum, comprising:

determining relative priorities of said subgroups;

said relative priorities being determined by policy rules that evaluate server node application state information following a cluster partitioning that produces said subgroups, said application state information including application criticality information and application client connectivity information collected during operation of said cluster prior to said cluster partitioning;

said application criticality information and said application client connectivity information allowing said relative priorities to be determined according to relative priorities of cluster applications run by said subgroups and relative numbers of cluster application clients connected to said subgroups such that a relative importance of each subgroup may be determined based on the cluster applications each subgroup runs and the cluster application clients each subgroup serves; and requesting a quorum based on said relative priorities so that a quorum will only be awarded to a subgroup having a highest relative subgroup priority.

9. A method in accordance with claim 8 wherein said server node application state information further includes information concerning one or more of resource connectivity or availability, processing capability and memory availability.

10. A method in accordance with claim 9 wherein said policy rules evaluate, for each of said subgroups, the number of cluster application clients connected to said subgroups, the priority of cluster applications run by said subgroup, and the ability to access resources from said subgroup.

11. A method in accordance with claim 10 wherein said policy rules assign different weights to different types of application state information for determining said relative priorities of said subgroups.

12. A method in accordance with claim 8 further including receiving said policy rules from one of said cluster applications at a policy rule interface.

13. A method in accordance with claim 8 wherein:

said server nodes share a state information resource;

each of said server nodes provides server node application state information to said shared state information resource;

said relative priorities are determined by subgroup priority determining logic implemented by at least one of said server nodes in each subgroup for inspecting said application state information for said server node's associated subgroup using said shared state information resource and determining a relative subgroup priority; and said quorum requesting is assisted by a quorum resource lock requester associated with each subgroup adapted to assert a quorum resource lock request according to an associated subgroup relative priority.

14. A method in accordance with claim 13 further including each server node determining a subgroup leader that will implement said priority determining logic and said quorum resource lock requester on behalf of said subgroup.

15. A computer program product comprising: one or more non-transitory data storage media comprising:

program logic recorded on said data storage media for programming one or more server nodes in a server cluster having plural server nodes implementing a server tier in a client-server computing architecture, said program logic programming said one or more server nodes to perform operations to determine which of two or more partitioned server subgroups running different cluster applications on behalf of cluster application clients has a quorum, said operations comprising:

determining relative priorities of said subgroups;

said relative priorities being determined by policy rules that evaluate server node application state information following a cluster partitioning that produces said subgroups, said application state information including application criticality information and application client connectivity information collected during operation of said cluster prior to said cluster partitioning;

said application criticality information and said application client connectivity information allowing said relative priorities to be determined according to relative priorities of cluster applications run by said subgroups and relative numbers of cluster application clients connected to said subgroups such that a relative importance of each subgroup may be determined based on the cluster applications each subgroup runs and the cluster application clients each subgroup serves; and requesting a quorum based on said relative priorities so that a quorum will only be awarded to a subgroup having a highest relative subgroup priority.

16. A product in accordance with claim 15 wherein said server node application state information further includes information concerning one or more of resource connectivity or availability, processing capability and memory availability.

17. A product in accordance with claim 16 wherein said policy rules evaluate, for each of said subgroups, the number of connected clients, the priority of cluster applications, and the ability to access resources.

18. A product in accordance with claim 17 wherein said policy rules assign different weights to different types of application state information for determining said relative priorities of said subgroups.

19. A product in accordance with claim 15 wherein said policy rules are set by one of said cluster applications that specifies said policy rules via a policy rule interface.

20. A product in accordance with claim 15 wherein said program logic further programs said one or more server nodes so that:

said server nodes share a state information resource;

each of said server nodes provides server node application state information to said shared state information resource;

said relative priorities are determined by subgroup priority determining logic implemented by at least one of said server nodes in each subgroup for inspecting server node application state information for said server node's associated subgroup using said shared state information resource and determining a relative subgroup priority;

said quorum requesting is assisted by a quorum resource lock requester associated with each subgroup adapted to assert a quorum resource lock request according to an associated subgroup relative priority; and each server node determines a subgroup leader that will implement said priority determining logic and said quorum resource lock requester on behalf of said subgroup.

* * * * *